Dec. 24, 1940.  E. W. BLEAM  2,226,236
WEIGHING SYSTEM
Filed July 22, 1937  3 Sheets-Sheet 1
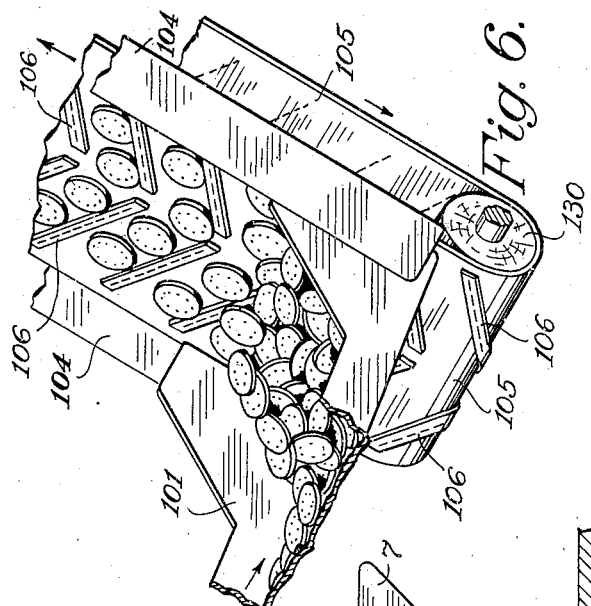
Fig. 6.
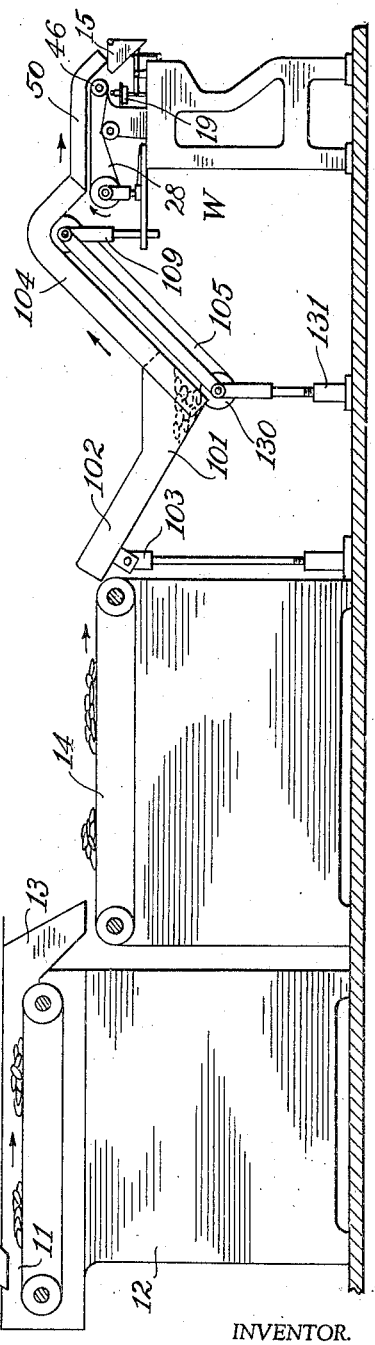
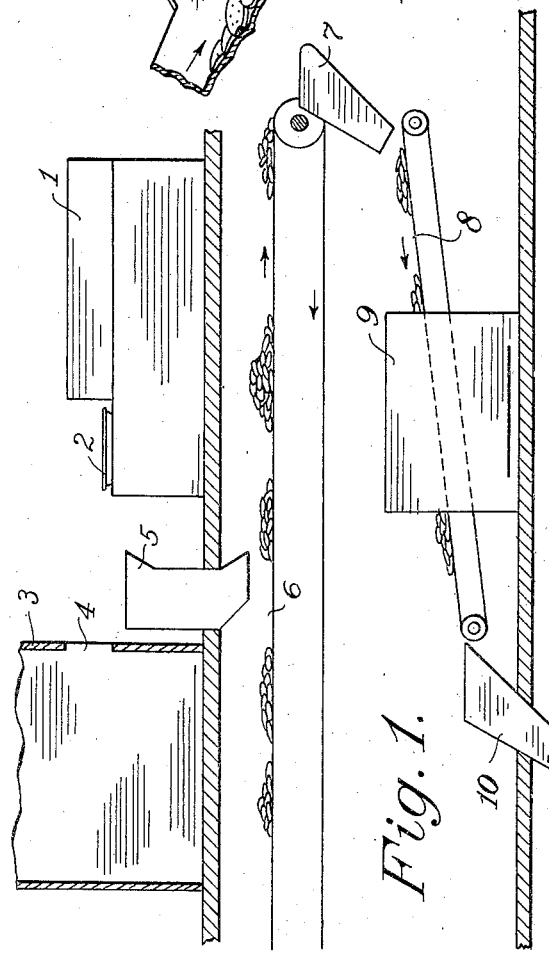
Fig. 1.
INVENTOR.
Edgar W. Bleam
BY
Cornelius D. Ehret
ATTORNEY.

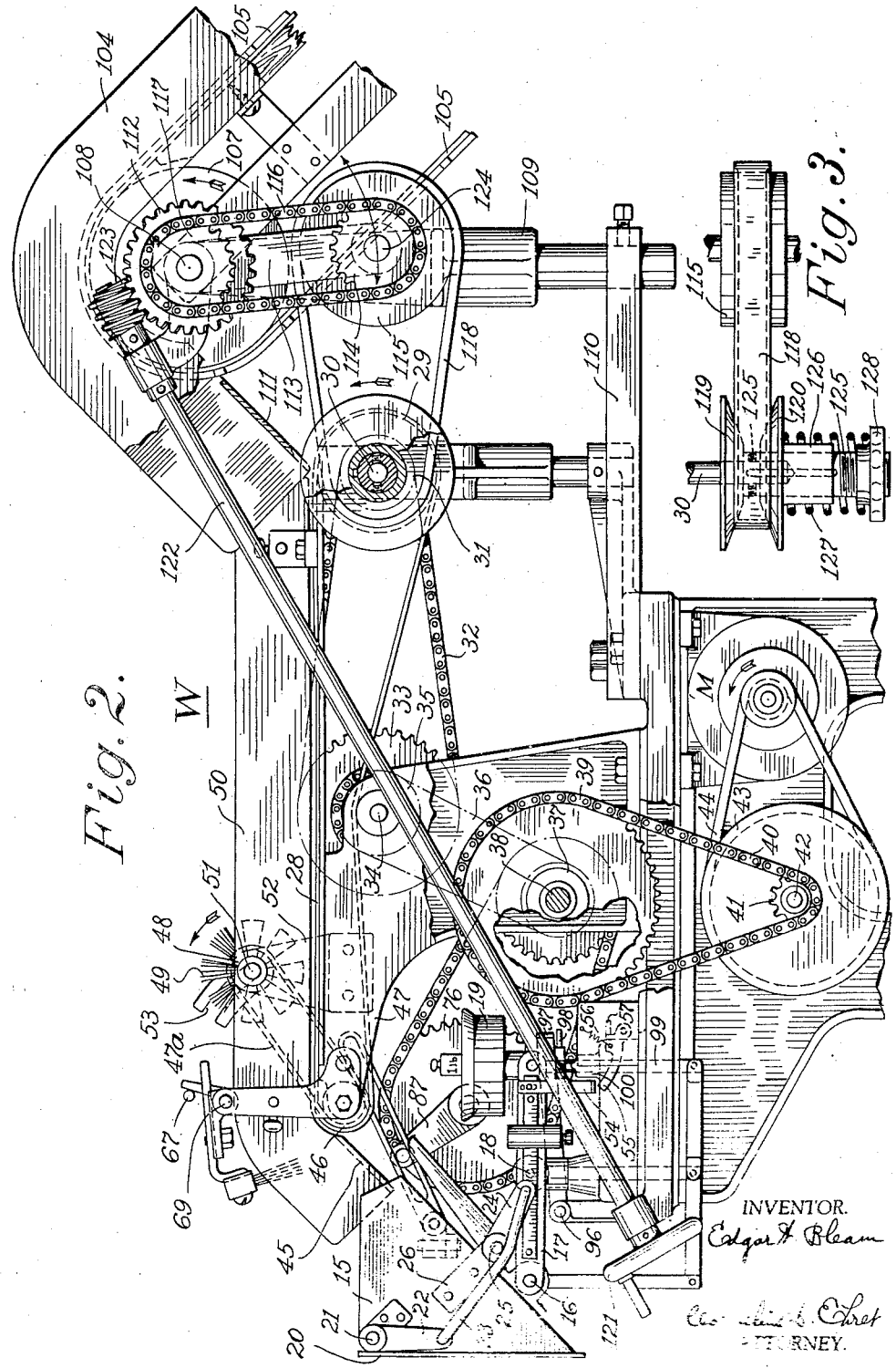

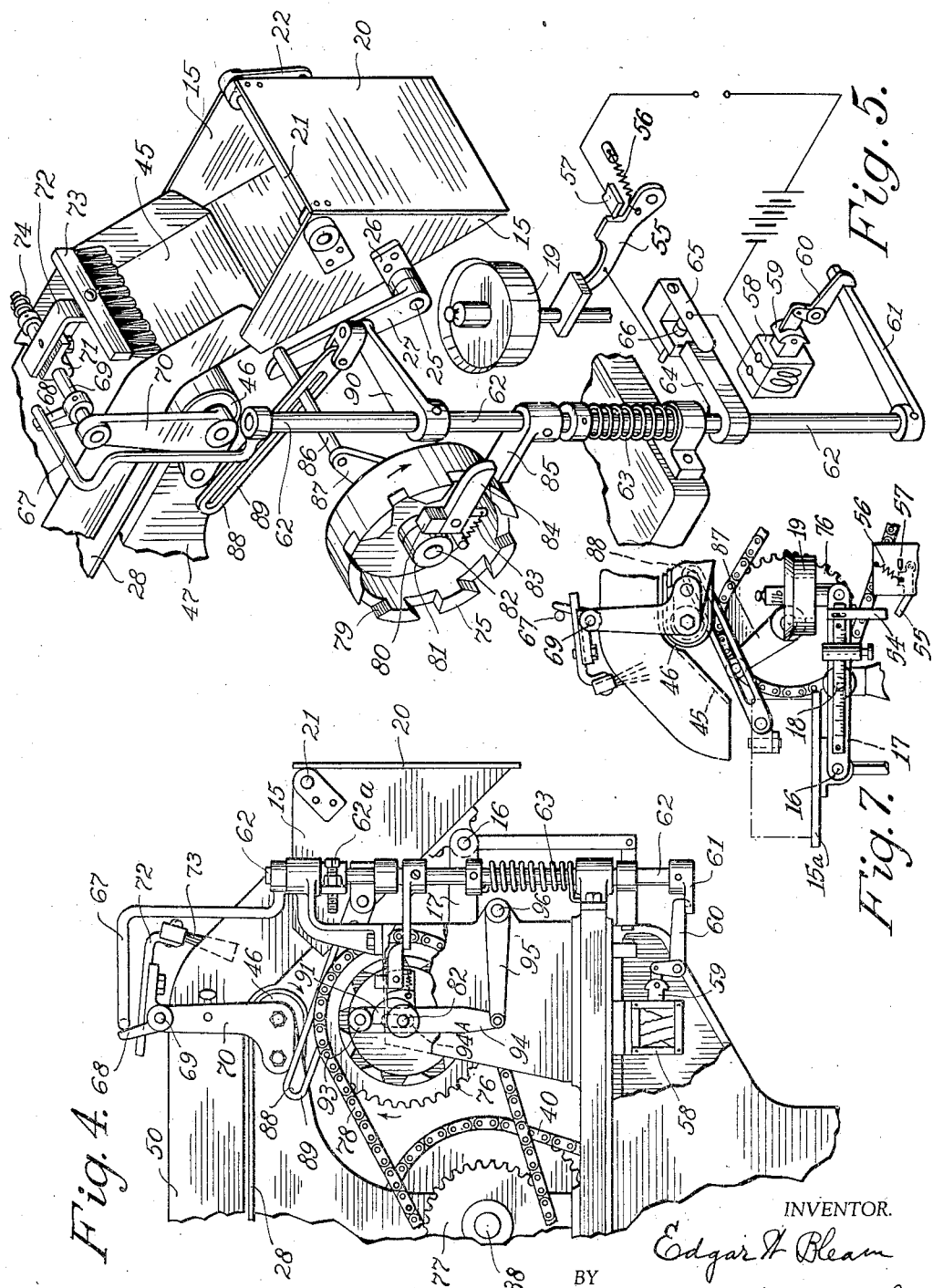

Patented Dec. 24, 1940

2,226,236

UNITED STATES PATENT OFFICE 2,226,236

WEIGHING SYSTEM

Edgar W. Bleam, Philadelphia, Pa., assignor to Stokes and Smith Company, Philadelphia, Pa., a corporation of Pennsylvania Application July 22, 1937, Serial No. 154,953

15 Claims. (Cl. 249—2)

My invention relates to automatic weighing systems, and particularly to systems for weighing material such as crackers or biscuits, candies, washers, nuts and the like, especially after processing.

In accordance with my invention, equal or unequal batches of material from one or more processing devices are delivered, as by a conveyor, to a hopper, or equivalent, for holding an accumulation of the material from which a substantially uniform stream is fed to a weighing machine, preferably by an endless belt conveyor forming a side or inclined wall of the hopper and preferably having transverse members or cleats at regular intervals to segregate the material to be weighed in approximately equal amounts.

More specifically, the conveyor from the hopper discharges the material at desired rate onto a belt conveyor in the weighing machine which feeds the material into the scale pan except when, in response to balance of the scale, the stream of material is automatically dammed, as by a brush, whose movement from its damming position is effected by mechanism whose cycle is initiated in response to balance of the scale.

My invention further resides in the features of construction, combination and arrangement hereinafter described and claimed.

For an understanding of my invention and for illustration of a preferred form thereof, reference is to be had to the accompanying drawings in which:

Figure 1 diagrammatically illustrates a system including several processing devices and an automatic weighing machine;

Fig. 2 is an elevational view, on enlarged scale, with parts broken away, of the weighing machine and part of the conveyor mechanism shown in Fig. 1;

Fig. 3 is a plan view of variable speed transmission mechanism shown in Fig. 2;

Fig. 4 is a side elevational view of parts shown in Fig. 2 but as viewed from the opposite side of the machine;

Fig. 5 in perspective illustrates scale-control elements shown in Figs. 2 and 4;

Fig. 6 is a perspective view illustrating the hopper end of conveyor mechanism shown in Figs. 1 and 2;

Fig. 7 is an elevational view of a modification adapting the scale to gross-weight measurements.

Referring to Fig. 1, as illustrative of a system in which my invention is of particular value, the kneader 1 mixes dough from which are cut cookies, crackers or the like placed by an operator in a pan 2 which is then disposed in a processing device, specifically an oven 3, of a type, for example, in which a continuously moving conveyor transports a continuous series of such trays slowly along a predetermined path so that by the time each tray arrives at the opening 4 of the oven, the contents thereof are baked. The operator then empties the tray of baked cookies into chute 5 and replaces the empty tray in the oven by a filled one from the kneader.

The batches of cookies dumped into the chute 5 fall upon a continuously movable conveyor belt 6 which, as indicated, may be common to several ovens. The spacing between the piles of material, specifically cookies, on the conveyor belt 6 is haphazard; they may be spaced at regular or irregular intervals and since batches from different ovens may be superimposed to form a single pile, the piles of material differ in size as between themselves.

At the discharge end of conveyor 6 the piles fall into the chute 7 which directs them onto another endless conveyor 8, which carries them through another processing device, for example, a sprayer 9 which may sprinkle some confection, or spray some substance, as butter, on the cookies of the batches. At the discharge end of the conveyor belt 8, there is a chute 10 which directs the successive batches onto the conveyor 11 of another processing device, for example, a dryer 12 in which heated air may be forcibly circulated to effect rapid drying of the cookies and/or the material sprayed thereon. From the delivery end of the conveyor 11 the successive batches of material fall into a chute 13 which directs them onto another endless conveyor 14 which conveys them toward an automatic weighing machine W.

In systems of this type in which the material to be weighed is delivered in batches which may arrive at irregular intervals and in varying amounts, it has not heretofore been feasible to utilize automatic weighing machines, particularly of the type shown in Figs. 2-5, which are capable of accurate weighing operations at speeds as high as 30 per minute. It is a principal object of the present invention to provide for continuous weighing of predetermined amounts of material delivered in batches from processing devices as baking or heat-treating ovens, dryers, or other processing devices of nature dependent upon the character of the material and the nature of the treatment.

Referring to Fig. 2, the scale pan or receptacle 15 of the weighing machine W is pivotally mounted at 16 to the scale beam 17 pivoted at 18 to the frame of the weighing machine. Upon the other end of the scale arm is mounted the weight pan 19. One side of the scale receptacle is closed by a door 20 pivotally secured to shaft 21, journaled in the side walls of the scale receptacle and to one end of which is secured the lever 22 connected by link 23 to arm 24 carried by shaft 25. The bearing members 26 for shaft 25 are secured to opposite sides of the scale pan 15, and to one end of shaft 25 is attached, as shown most clearly in Fig. 5, the door operating arm 27 which, as hereinafter described, is operated automatically upon balance of the scale to discharge the weighed contents of the scale pan into suitable container, such as a bag or box, which may be held by the operator below the scale pan or which may be moved to that position by a conveyor or equivalent.

Material is fed toward the scale pan from the receiving end of the machine by a conveyor belt 28 which is driven by pulley 29 on shaft 30, Fig. 2, to which is secured the sprocket 31 driven by motor M through chain 32, sprocket 33, shaft 34, sprocket 35, chain 36, sprocket 37, shaft 38, sprocket 39, chain 40, sprocket 41, shaft 42, pulley 43 and belt 44. The conveyor belt 28 at its discharge end is substantially tangent to the downwardly inclined chute 45 and there passes over the idler roll 46 journaled in frame members 47 of the machine.

The idler roll 46 is connected as by belt 47a to the driving member 48 for the brush 49 which rotates above the belt in the space between the side members 50 which, with the conveyor belt, define a chute or trough for the stream of material fed towards the scale receptacle. The shaft 51 on which the brush 49 rotates can be adjusted angularly about the axis of idler roll 46 as a center to vary the clearance between the belt and the brush which, as indicated, revolves in such direction that the bottom of the brush is traveling in a direction opposite to the upper lift of the conveyor, i. e., counter to the stream of material being fed toward the scale receptacle. To allow this adjustment, the bracket 52, which receives the brush shaft 51, is at its upper end provided with an arcuate slot 53.

When the scale is balanced, the member 54, Fig. 2, depending from the scale arm 17, moves away from the contact member 55, permitting the spring 56 to move it into engagement with contact 57 to complete a circuit through the solenoid or electro-magnet 58 (Figs. 4 and 5) whose core or armature member 59 is mechanically connected to the latch 60.

The movement of the armature 59 in response to energization of the solenoid releases the latch 60 from the arm 61 at the lower end of a control-shaft 62, permitting the latter to be rotated in clockwise direction, as viewed in Fig. 5, by the biasing spring 63 and to an extent limited by the adjustable stop 62a. This movement of the shaft 62 causes the arm 64 thereon to move contact 65 from contact 66 and so interrupt the solenoid circuit, even though contacts 55 and 57 of the scale-switch may remain in engagement.

To the upper end of shaft 62 is connected the arm 67, which, upon clockwise movement of shaft 62 as aforesaid, moves away from the stop member 68 secured to shaft 69 which is positioned above the conveyor side members 50 by the brackets 70, 70. To the shaft 69 is attached the bracket or support 71 to which is adjustably secured the arm 72 carrying a brush 73 which normally, as appears in Fig. 2, is out of the path of the material passing from the conveyor down chute 45 to the scale receptacle.

Upon clockwise movement of shaft 62, effected immediately upon balance of the scale, as above described, the arm 67 is moved away from stop 68, permitting the brush 73 quickly to be swung by spring 74 downwardly into position to dam the stream of material being fed to the scale. The brush is moved away from this stream-damming position by a one-time clutch mechanism, now described, whose cycle is initiated in response to balance of the scale.

The driving member 75 of the clutch (Figs. 4 and 5) is attached to the sprocket 76 which is continuously driven from the sprocket 77 on shaft 38 by the chain 78. The driving member 75, freely rotatable on shaft 82, is provided with a series of notches 79 each suited to receive the driven clutch member 80 pivotally mounted on the member 81 which is secured to shaft 82. The spring 83 connected between members 81 and 80 biases the latter toward engagement with the notched periphery of the driving clutch member, but for the position of the parts shown in Fig. 5, the driven clutch member is restrained from such movement by engagement of the member 84 attached thereto with the stop 85 secured to the control shaft 62.

When, in response to balance of the scale, the shaft 62 is rotated in clockwise direction (Fig. 5) as aforesaid, the stop 85 is moved clear of the clutch-restraining member 84, whereupon the driven clutch member 80 swings into engagement with the driving clutch member 75. Thereupon pin 86, extending from arm 87 secured to shaft 82, swings the arm 27 in counterclockwise direction (Fig. 5) to open the door 20 of the scale receptacle, causing discharge of the contents. As the rotation of the shaft 82 continues, the pin 86 slides off arm 27, permitting the door to reclose in readiness for the next weighing operation, and at the end of the cycle resumes the position shown in Fig. 5.

During the revolution of arm 87 with the driving clutch member 75, the pin 86 engages the end of slot 88 in arm 89 which is pivoted to arm 90 secured to the control shaft 62, and for continued movement within the cycle of the clutch mechanism pulls the arm 90 in counterclockwise direction as viewed in Fig. 5 to return shaft 62 toward the latched position shown in Fig. 5 against the action of the biasing spring 63. Near the end of the resetting movement the arm 61 at the lower end of shaft 62 rides under the nose of the latch 60 which prevents the shaft 62 from rotating in reverse direction when pin 86 moves out of engagement with the end of the slot for return to its original position shown in Fig. 5.

Since arm 67 is, as above described, secured to shaft 62, it is effective during the resetting movement of the control shaft by its engagement with member 68 to move the brush 73, against the biasing action of spring 74, from its stream-damming position, whereupon the material is again fed down inclined chute 45 to the scale pen. When the brush is first lifted, the rate at which the material moves into the scale pan is relatively high because of the accumulation of material dammed up by the brush on the conveyor, but after this first bulk discharge, the material flows as a thin stream into the scale receptacle at the rate at which it is fed by the conveyor belt 28.

To preclude improper operation of the scale, particularly when a relatively large quantity of material is dumped into the scale receptacle upon lifting the brush 43, there is provided mechanism operated by the one-cycle clutch which locks the scale beam against movement except for that part of the machine cycle which is appreciably after lifting of brush 43. Specifically, the cam 91 on the driven clutch shaft 82 cooperates with a cam follower 93 on a vertically reciprocable bar 94 having a slot 94A through which extends the shaft 82. To the lower end of bar 94 is connected the arm 95 attached to shaft 96 which, as most clearly shown in Fig. 2, is connected to the scale-locking arm 97 adapted when rotated in clockwise direction (Fig. 2) to engage the pin 98 secured to the scale member 99 and force it downwardly against the stop 100. Upon balance of the scale, and tripping of the clutch, the cam 91 rotates clockwise (Fig. 4) permitting the arm 94 to drop, which causes the scale-locking member 97 to depress the weight upon the arm of the scale and hold it against any movement such as would otherwise be occasioned by the first heavy rush of material incident to lifting of brush 73. As shaft 82 continues to rotate, the bar 94 is lifted to effect release of the scale; as heretofore stated, the time of release of the scale beam is such that the scale is not free until appreciably after lifting of the brush 73 by the control shaft.

For accurate, high-speed weighing, i. e., a large number of cycles per minute, it is important the material be fed to the conveyor 28 in the form of a relatively thin stream having substantial uniformity. It is not feasible, therefore, in a system such as shown in Fig. 1, to have conveyor 14 discharge onto the conveyor 28 of the weighing machine because, even though the total quantity of material delivered by conveyor 14 over a substantial interval of time, at least approximately corresponds to the amount of material which the weighing machine is capable of segregating and weighing in that time; the wide differences in level of material on belt 28 results in different amounts of material being beyond the brush 73 on its way to receptacle 15 when the brush descends.

To overcome the difficulty, the material from the conveyor 14 is discharged into a hopper 101 (Fig. 1). For simplicity, the hopper and the chute 102 extending to it from conveyor 14 may be integral; the hopper at its upper end is pivoted to the support 103 whose height is preferably adjustable. The lower end of the hopper, or sides of the chute 102, nests with the side guides 104 for an endless conveyor belt 105 the lower end of which, as appears in Fig. 6, forms, in effect, one side of the hopper. Preferably the belt 105 is of fabric to which is sewn, or otherwise suitably secured, a number of regularly spaced transverse members or cleats 106, preferably of leather, rubber, or like material. It is not essential the members 106 be continuous; they may, in fact, be comprised of a series of buttons, or abutments, suitably spaced. For feeding of cookies, for example, each pair of cleats is preferably divergent in the direction of conveyor movement with a small opening between their adjacent ends to permit escape of crumbs and small broken pieces. The distance between the successive cleats is preferably, for feeding of cookies, slightly greater than their diameter if circular, or greatest dimension if non-circular. Preferably the thickness of the cleats is approximately equal to the thickness of the cookie, or other unit mass of material. The belt 105, in moving upwardly through the accumulation of cookies or other material to be weighed in the hopper 101, agitates and loosens up the mass; each successive pair of cleats defines a shallow pocket which picks up a substantially definite number of cookies. The accumulated material in the hopper itself serves to prevent movement with the belt of the cookies or articles projecting above the cleats and so insures the belt shall not feed more than a thin, substantially uniform stream of the material from the hopper; this action is enhanced by operating the belt on a rather steep incline, as shown in Figs. 1 and 6, since then the vibration incident to operation of the machine causes the cookies, or the like, above the cleats to slide back into the hopper.

The optimum angle of inclination for belt 105 varies with the size, shape and other characteristics of the material; in general, the greater the tendency for the material to slide back toward the hopper, the less steep the angle may be.

It is, of course, understood that for different classes of material, it may be necessary or desirable to use belt having different spacings and thicknesses of cleats.

The conveyor belt 105 is driven, as shown in Fig. 2, by a roll 107 on shaft 108 supported by bracket member 109 extending upwardly from and adjustably held to the shelf 110 secured to the frame of the weighing machine. The belt 105 at its lower end passes over idler roll 130 whose shaft is supported by the adjustable standard 131. The side guides 104 pass over and beyond shaft 108 and are there joined by the plate 111 to form a chute which directs the thin uniform stream of material from belt 105 onto the belt 28 of the machine. If perchance the stream has slight irregularities or non-uniformities, these are smoothed out by the revolving brush 49 previously described.

By slight modification, the weighing machine may be adapted for gross weight operation; specifically, the receptacle 15 may be replaced, as shown in Fig. 7, by a platform 15a for supporting a can, box, or the like, which functions as a temporary scale receptacle during a weighing operation, as well as the ultimate container for the weighed amount of material. In some cases it may be necessary or desirable to change the shape of chute 45 to suit the particular shape of the can or box.

The rate at which material should be fed to the weighing machine depends not only on the number of cycles per minute, but also upon the quantity of material to be weighed in each cycle; therefore, to utilize to full advantage the high-speed possibilities of the weighing machine, it is desirable to provide for change in the rate at which conveyor 105 feeds a uniform stream to the weighing machine. This may be accomplished by a variable speed transmission, such as shown in Figs. 2 and 3. Specifically, the worm gear 112 loosely journaled on shaft 108 is attached to arm 113 from the lower end of which extends the stud shaft 124 on which are rotatable as a unit a sprocket 114 and pulley 115. The sprocket 114 is connected as by a chain 116 with sprocket 117 secured to conveyor drive shaft 108. The driving belt 118 for pulley 115 is preferably of the flat V-type having a flat face for engaging the periphery of pulley 115 and inclined sides for engaging the opposed faces of the cones 119, 120 on shaft 30.

The operator, by rotating hand-wheel 121,

Fig. 2, in one direction or the other, rotates shaft 122 to which is secured worm 123 in mesh with worm-wheel 112 and so swings shaft 124 in an arc whose center is the axis of shaft 108 and whose radius is the distance between the axes of shafts 108 and 124. Thus, without stopping the conveyors or interrupting operation of the system, the operator may change the speed of conveyor belt 105; for clockwise adjustment of arm 113, Fig. 2, the belt 118 rides higher on the cones 119, 120 and the conveyor belt 105 is driven at higher speed; conversely counterclockwise adjustment of arm 113 which increases the distance between shafts 30 and 124 causes the belt 118 to ride deeper in the groove formed by the opposing faces of the cones and so effects reduction in speed of conveyor 105.

The spacing between cones 119, 120 varies automatically with adjustment of arm 113. The hub 125 for cone 119 is secured to shaft 30 and is elongated slidably to receive the hub 126 of cone 120. The compression of spring 127 which encircles hub 126 and bears against cone 120 is adjustable by the hand-nut 128 threadably received by hub 125 of cone 119. The force of the spring 127 biases the cones toward each other but the spacing of the cones is determined by the depth at which the belt is riding in the groove formed by opposing faces of the cones which depth in turn depends upon the distance between shafts 30 and 124 as selected by adjustment of hand-wheel 121.

In systems whose output is in excess of the capacity of a single weighing machine, some of the batches of material from conveyor 14 or its equivalent may be diverted to one or more additional weighing machines each provided with a hopper 101 and conveyor 105 for accumulating the material and feeding from the accumulation a substantially uniform stream to the associated weighing machine.

What I claim is:

1. An automatic weighing system comprising a scale, a conveyor movable to feed a stream of material to said scale, means responsive to balance of said scale temporarily to dam said stream, a hopper for the material to be weighed, and an endless belt conveyor for feeding material from the hopper to said first conveyor at a substantially uniform rate.

2. An automatic weighing system comprising a scale, a scale receptacle, a conveyor movable to feed a stream of material to said receptacle, means responsive to balance of said scale to dam said stream during emptying of the receptacle, a hopper for the material to be weighed, and an endless belt conveyor forming a wall of said hopper for feeding material therefrom at substantially uniform rate to said first conveyor.

3. An automatic weighing system comprising a scale, a scale receptacle, a conveyor movable to feed a stream of material to said receptacle, means responsive to balance of said scale to dam said stream during emptying of the receptacle, a hopper for the material to be weighed, and an endless belt conveyor forming an upwardly inclined wall of said hopper and having transverse members for lifting and segregating substantially uniform amounts of said material and discharging them onto said first conveyor.

4. An automatic machine for weighing a predetermined quantity of material in each of successive operations comprising a scale, a scale receptacle, a continuously operating conveyor for feeding the material to said receptacle, a hopper for the material to be weighed, a second continuously operating conveyor for feeding a stream of the material at a substantially uniform rate from said hopper to said first conveyor, means operative upon balance of the scale to dam material on said first-named conveyor for a predetermined period, and means for correlating the quantity of said material to be weighed in each operation and the number of weighing operations per unit of time comprising means for varying the ratio to each other of the speeds of said conveyors.

5. An automatic weighing machine comprising a scale receptacle, a continuously operating conveyor for feeding material to said receptacle, a hopper for the material to be weighed, a second continuously operating conveyor for feeding material at substantially uniform rate from said hopper to said conveyor, and means for varying the speed-ratio of said conveyors during their operation.

6. An automatic weighing machine comprising a scale, a scale receptacle, a conveyor for feeding a stream of material at substantially uniform rate toward said scale receptacle, means operative upon balance of the scale to dam the stream to said receptacle for a predetermined period, and a variable speed transmission for adapting the speed of said conveyor for different weighing rates comprising a shaft coupled to said conveyor, a driving shaft therefor, a pair of spaced cones rotatable with one of said shafts, means for varying the spacing of said cones in effect to provide a pulley of variable diameter, a pulley of fixed diameter on the other of said shafts, and means for varying the separation of said shafts.

7. An automatic weighing system comprising a scale having a platform for supporting a removable receptacle, a conveyor for feeding a stream of material to said receptacle, means responsive to balance of the scale for damming said stream during absence of said receptacle from said platform, a hopper for said material, and an endless belt conveyor forming an inclined wall of said hopper for feeding material upwardly therefrom and delivering it at substantially uniform rate to said first conveyor.

8. An automatic weighing system comprising a scale, having a platform for supporting a removable receptacle, a conveyor for feeding a stream of material to said receptacle, means responsive to balance of the scale for damming said stream during absence of said receptacle from said platform, a hopper for said material, and an endless belt conveyor forming an upwardly inclined wall of said hopper and having transverse members for lifting and segregating substantially uniform amounts of said material and discharging them at substantially uniform rate onto said first conveyor.

9. A weighing machine comprising a scale, a scale receptacle, a conveyor having a substantially horizontal surface for feeding a stream of material toward said receptacle, a revolving brush above said horizontal conveyor surface for limiting the depth of said stream of material thereon, and structure actuated in response to balance of the scale to dam said stream between said revolving brush and said receptacle.

10. A system comprising a hopper, means for delivering material thereto at non-uniform rate, an automatic weighing machine, and means for conveying material from said hopper to said weighing machine including a conveyor belt forming an inclined wall of said hopper and having transverse members for lifting and segregating substantially uniform amounts of said material.

11. A system comprising a hopper, means for delivering material thereto at non-uniform rate, an automatic weighing machine having a scale and a scale receptacle, means for conveying material from said hopper to said weighing machine comprising a conveyor belt forming an inclined wall of said hopper and a second conveyor belt for receiving material at substantially uniform rate from said first belt and feeding it in a stream toward said scale receptacle, means for continuously operating said conveyor belts at uniform speed, and means responsive to each balance of said scale temporarily to dam the stream on said second conveyor belt.

12. An automatic weighing system comprising a scale having a platform for supporting a removable receptacle, a conveyor for feeding a stream of material to said receptacle, means responsive to balance of the scale for damming said stream, a hopper for said material, and an endless belt conveyor forming an inclined wall of said hopper for feeding material upwardly thereof and delivering it at substantially uniform rate to said first conveyor.

13. A system for weighing crackers, candies and like objects comprising a hopper, means for conveying batches of said objects to said hopper, an automatic scale, means including a conveyor belt for transferring objects in a stream from said hopper to said scale, structure responsive to balance of the scale for damming the stream upon said conveyor belt, and structure continuously effective to limit the depth of the stream in advance of said first-named structure.

14. A system for weighing crackers, candies and like objects comprising a hopper, means for conveying batches of said objects to said hopper, an automatic scale, means for transferring said objects from said hopper to said scale comprising an endless conveyor belt forming an upwardly inclined wall of said hopper and having transverse members for segregating and lifting objects in a substantially uniform stream from said hopper and a second endless conveyor belt for receiving objects discharged from said first-named conveyor belt and transporting them to said automatic scale, yielding structure responsive to balance of the scale for damming the stream upon said second-named conveyor belt, and yielding structure continuously effective to limit the depth of the stream in advance of said first-named structure.

15. A system comprising an automatic weighing machine including a scale and a substantially horizontal conveyor adapted to feed frangible objects to said scale, means responsive to balance of the scale temporarily to obstruct feed of said objects by said conveyor to said scale, a hopper for receiving batches of said objects, and an upwardly sloping and moving endless conveyor for feeding said objects from said hopper to said first conveyor in successive substantially uniform groups including structure for segregating and retaining the groups, the excess objects not so segregated and initially tending to move upwardly therewith falling back into said hopper.

EDGAR W. BLEAM.